Nov. 11, 1952 R. A. HILL 2,617,263
SPILLWAY GATE
Filed July 19, 1948 3 Sheets-Sheet 1

INVENTOR.
Raymond A. Hill,
BY
ATTORNEY.

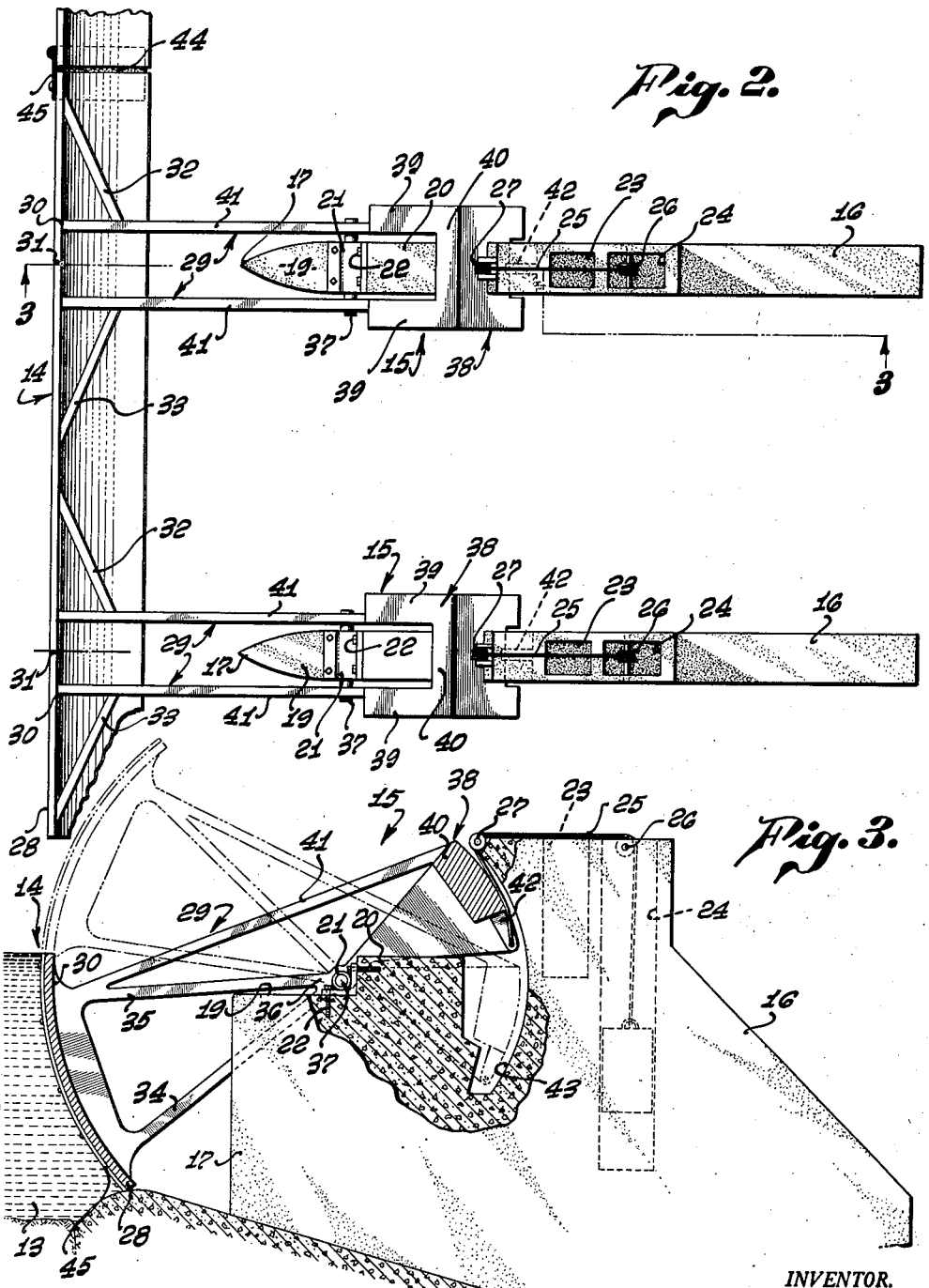

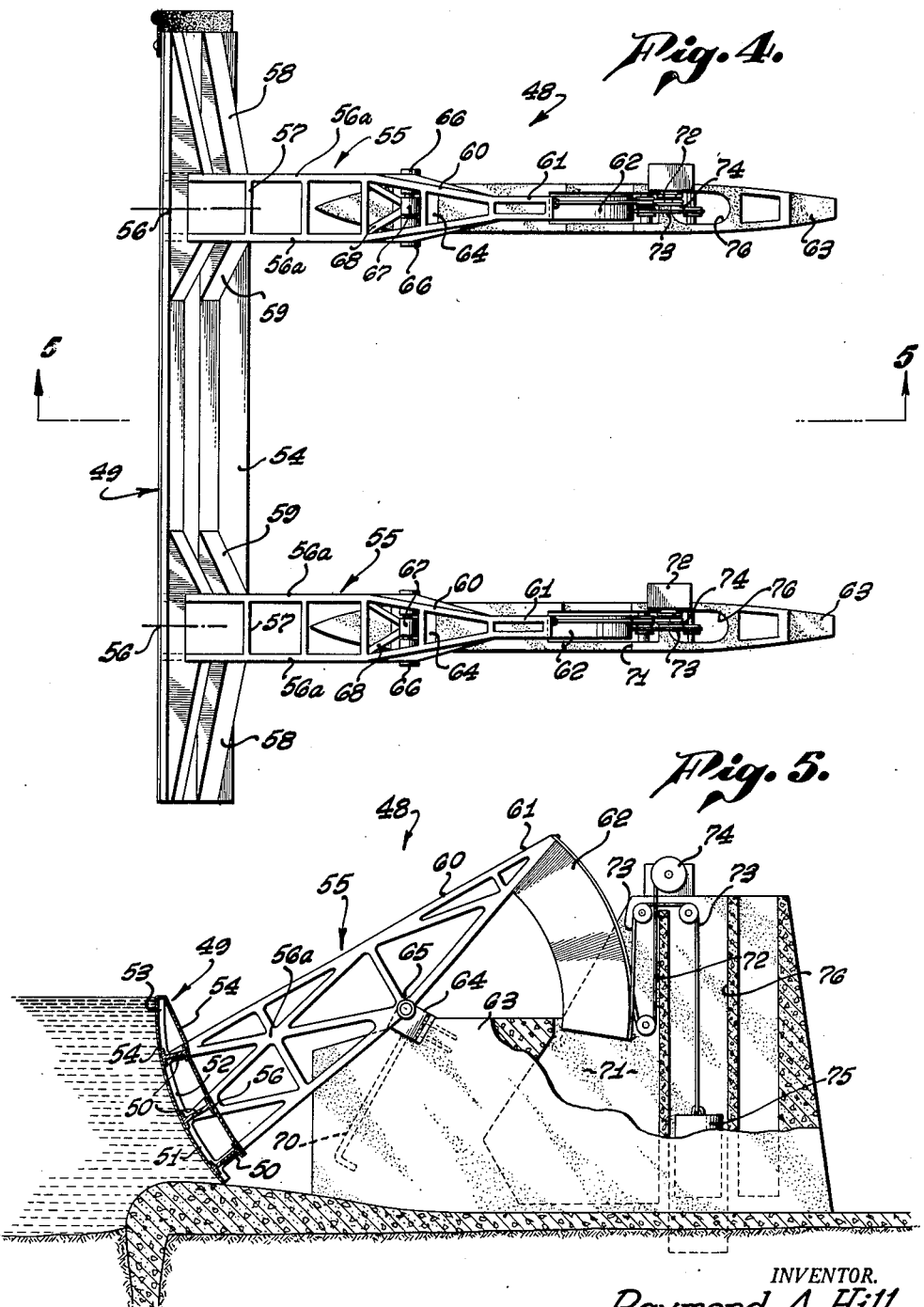

Patented Nov. 11, 1952

2,617,263

UNITED STATES PATENT OFFICE 2,617,263

SPILLWAY GATE

Raymond A. Hill, San Marino, Calif.

Application July 19, 1948, Serial No. 39,425

9 Claims. (Cl. 61—25)

This invention has to do with improvements in radial gate systems used for controlling the spillway overflow of water from dams. Particularly contemplated are advancements in the functional characteristics of the gate arrangement and operation, as well as important structural advantages with respect to the support given the gates and their mountings against the pressures and loads which they are required to assume.

Heretofore, the most general practice has been to mount the individual gates of a series extending across the spillway, between piers which support the gates by way of arms attached to the gate faces, in most cases at their ends, and journaled in bearings carried by abutments offset from the gates, or offset from alinement (normal to the gate face) with the point of attachment to the gate face. Where supported at their ends, the gates are subjected to a bending moment which is a maximum at the center of the gate span. This relation imposes design problems and limitations in reinforcing the gate to assume the bending moment. Also, with the usual gates being supported at their ends by single arm frames, there is always difficulty in designing the latter against buckling under column stresses.

According to the ordinary gate mounting, the hinge bearings are necessarily outside the pier face, while anchorage is required at the inside of the face. Consequently, there is a tendency for rotation of the hinge pin housing or bearing, to apparent disadvantage from standpoints of design and stability. It may be further mentioned that the gate hinge pins usually are anchored to a housing on the down stream face of the piers, and the stresses transmitted from the gate to the housing are taken for the most part by tension in anchor rods. In other instances the gate pin housings may be embedded in concrete but in either case the housing is given less positive support than is made possible according to the present invention, where preferably the housings are mounted on the up stream extent of the piers, all as will later appear.

One of my major objects is to provide an improved system of radial gate mounting according to which each gate is supported at distances inwardly from the ends of the gate, corresponding to substantially one-fourth to one-fifth of the gate length. With the gate face thus supported, the bending moments may be distributed to better advantage longitudinally of the gate faces, as more particularly dealt with in considering the particular embodiments later described. Being offset inwardly from the ends of the gate and extending normal to the gate face, the supporting arms are in direct compression, there being no tendency for creation of consequential transverse stress between the gate face and arms.

Particularly contemplated is a gate supporting arm structure comprising two sets of parallel frames which can be given any desired degree of lateral stability, and which serve as parallel columns which assume the hydraulic load against the gate face. By virtue of the parallel supporting frame arrangement, it is made possible to locate the gate hinge bearings in symmetrical or balanced relation to the frames of each pair, thus providing for direct and symmetrical transmission of loads to the bearings, to obvious advantage in facilitating the design and support of the bearings. This arrangement further permits mounting the hinge pin bearings on the upstream face of the piers.

A further advantage of the present gate supporting frame arrangement and its relation to the piers is that drift which tends to collect on the noses or up stream ends of the piers when the gates are open, can be removed in the dry when the gates are closed, because of the down stream positions of the piers from the gates. Where the ordinary gates are used, such drift must be grappled for under water, and even when the gates are closed the drift must be lifted over them or taken away in a barge.

The above mentioned, as well as variational features and objects of the invention will be more fully understood and explained to best advantage in the following detailed description of an illustrative embodiment of the invention shown by the accompanying drawings, in which:

Fig. 2 is an enlarged plan view showing one of the gates and its supporting frames and piers;

Fig. 3 is an elevation, partly in section, taken on line 3—3 of Fig. 2; and

Figs. 4 and 5 are views similar respectively to Figs. 2 and 3, showing a further and preferred embodiment of the invention.

Figure 1:
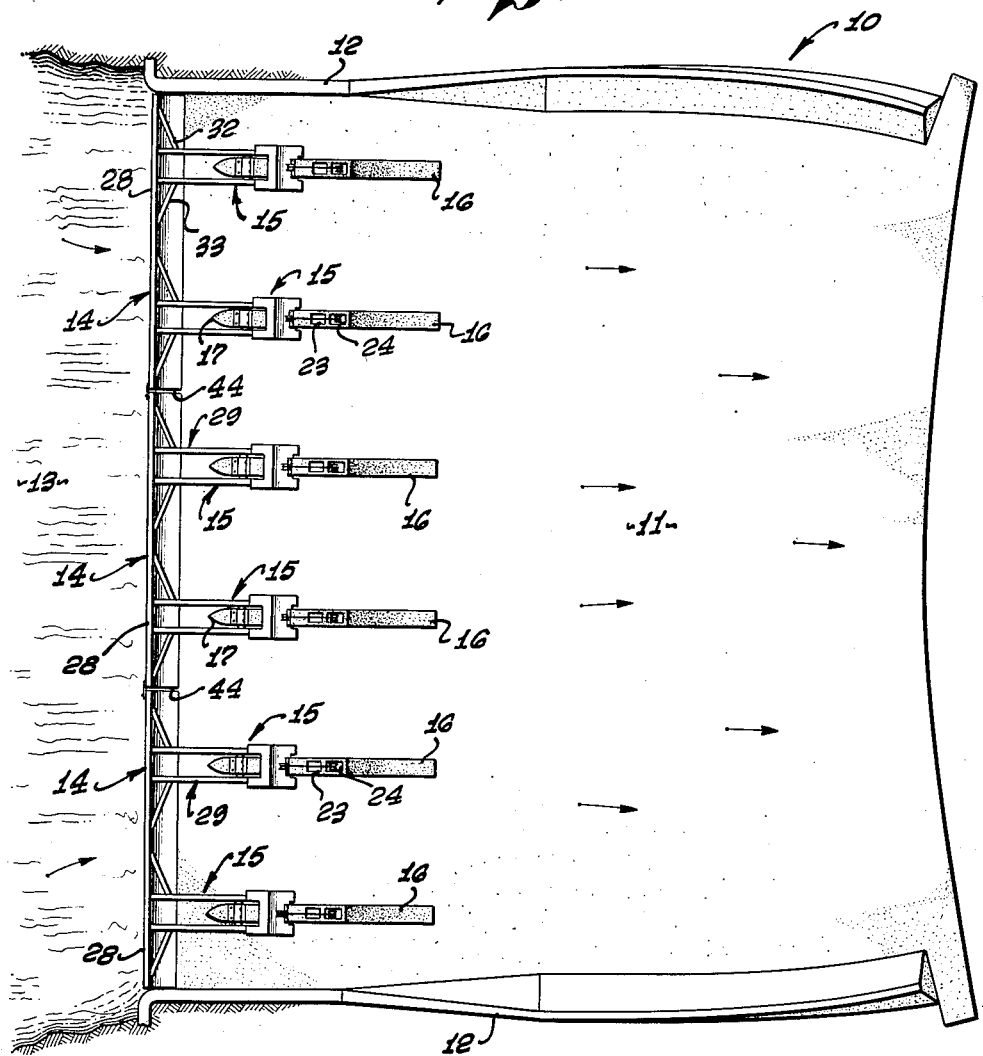
Fig. 1 is a general plan view showing one form of gate series, piers and gate supporting frame assemblies, as positioned in a spillway.

Referring first to Fig. 1, the spillway generally indicated at 10 is shown as the usual overflow channel having a floor 11 and sides 12, water flowing from the dam side 13 through the spillway in the direction indicated by the arrows. The water flow through the spillway is controlled by a series of bascule type radial and vertically adjustable gates, generally indicated at 14, the general structure of which includes counterweighted arm or frame structures 15. The gate assemblies are carried by concrete piers 16 positioned within the spillway at the down stream side of the gate faces, and spaced apart at intervals corresponding to the spacing of the arm juncture with the gate faces.

As best illustrated in Fig. 3, each pier 16 comprises an upstanding concrete body, the forward end or nose 17 of which may be pointed, as illustrated. The forward top surfaces 19 and 20 of the pier may have the illustrated stepped relation to accommodate the gate hinge pin bearing 21 secured to the pier by anchor bolts 22 embedded in the concrete. The rear elevated portion of the pier may contain the usual wells 23 and 24 for accommodation of mechanisms for controlling the raising and lowering of the gates 14, all in a manner familiar to those acquainted with this art. For present purposes it will suffice to indicate that elevation of the gate may be effected by any suitable control means in the wells 23 and 24, as by way of cable 25 passing over the pier supported pulleys 26 and 27.

Each radial gate 14 comprises a curved face 28 which closes down against the bottom of the spillway as shown in Fig. 3, this face plate being supported by two parallel sets of arm frames 29 attached at 30 to the gate face at opposite sides of points 31 which, as previously indicated, are located at distances from the ends of the gate, within the range of about one-fourth to one-fifth the gate length. Diagonal braces 32 and 33 reinforce the gate face and supporting frame assembly so that if desired, the bending moment at the center of the gate may be reduced to substantially zero, with the load transmission concentrated at the connecting loci of the frames 29. The later described variational form of the invention illustrates how the same general range of supporting arm spacing may be employed to give substantial correspondence of the bending moments at the center of the gate and means points of attachment to the arms.

Each of the individual frames 29 comprises a pair of arms 34 and 35 converging to a juncture at 36 which carries one end of the hinge pin 37 journaled in the bearing 21. Thus the frames 29 serve as compression columns transmitting the hydraulic load from the gate faces in symmetrical and balanced relation to the hinge pin 37 and bearing.

Each frame assembly 29 includes a substantially integral counterweight 38, the side portions 39 of which are swingable downwardly at opposite sides of the pier 16 and are interconnected by bridge portion 40. Braces 41 connect arms 35 with the upper extent of the counterweight. Each counterweight carries an arm 42, projecting centrally from the bridge portion 40, and to which the cable 25 is attached for rotation of the gate and counterweight assembly about the hinge pin 37. When the gate is fully raised and opened to the broken line position shown in Fig. 3, arm 42 and its cable connection are swung downwardly and accommodated within recess 43 in the pier.

The gate faces 28 are disposed in substantially end to end relation, with sufficient clearance at 44 to accommodate expansion. Provision may be made for minimizing water leakage between the adjacent edges of the gates, as by attaching to the outer face of one of the gates a bank of flexible sealing material 45 which bridges across the space 44 and overlaps the surfaces of the adjacent gate.

Reference previously has been made to the removability of drift or other debris from the pier noses in the dry, and without having to undertake the usual operations of grappling in water. As shown in Fig. 3 when the gates are closed, the spillway becomes directly accessible to the bottoms of the pier noses for the removal of debris.

Figs. 4 and 5 illustrate a variational and preferred form of bascule-type radial gate embodying the invention, and which has certain advantages over the previously described form, particularly with respect to accommodation of the counterweight inside the pier, and free from interference with the slip streams at either side of the pier.

Here the gate assembly, generally indicated at 48, includes a curved face structure 49 comprising a plurality of internal, longitudinally extending I-beams 50 and transverse reenforcing sections 51, 52, and 53 which may be used at appropriate intervals, longitudinally of the gate, as required to give the latter necessary strength and stability. The outer surfaces of the gate may be formed by a suitable covering or sheath 54.

As before, the gate face 49 may be carried by a pair of arm assemblies 55 extending down stream at substantially right angles and attached to the gate face at locations 56 spaced from the ends of the gate a distance corresponding to about ¼ to ⅕ the gate face length. Each of the arm assemblies 55 comprises a pair of parallel frames 56a connected by cross members 57, the joints between the frames and gate face being reenforced by braces 58 and 59. The frames 56 converge rearwardly at 60 to arm portions 61 carrying the counterweight 62 positioned symmetrically with relation to the longitudinal, central and vertical plane of the arm assembly.

The arm assemblies are mounted on concrete piers 63 and are carried by hinge bodies 64 each of which includes a pin 65 extending through bearings 66 carried by the frames 56, and an intermediate bearing 67 secured to the arm frames by braces 68. Thus the hinged support given the gate is symmetrically balanced with relation to both the pier 63 and arm assemblies 55. The hinge plate or body 64 may be securely anchored against displacement by the water pressure load transmitted to the gate, as by tension rods 70.

Mounted and arranged as shown in Fig. 5, the counterweight 62 has its center of mass substantially in alinement with that of the gate face 49 in a transverse plane passing through the hinge 65. In its up position, the counterweight directly overlies the pier, and when the gate face is raised, the counterweight is swung down within a space 71 inside the pier, so that the counterweight is accommodated entirely therein, leaving the spillway channels at both sides of the pier free for water flow without possible interference by the counterweight. The latter is shown to be connected to the operating cables 72 and 73 which may be operated by any suitable controls such as the hoist drum 74 on which cable 72 is wound, and a counterweight 75 attached to cable 73 and contained in the pier well 76. As will be understood by those familiar with such control systems, water may be admitted to the well 76 at controlled rate so as to submerge the counterweight 75 variably and to the depths required for operation and control of the gate assembly.

I claim:

1. A spillway gate system comprising a radial gate having a face extending transversely of the spillway, a pair of stationary piers in the bed of the spillway and extending longitudinally of the spillway at the downstream side of the gate face, said piers being spaced from the sides of the spillway and spaced apart a distance less than the face width, said gate comprising arms attached to said face and extending to the piers, and bearings carried by said piers and mounting said arms for vertical swinging of the gate, said arms being positioned relative to the gate face and bearing so that the resultants of the forces created by the water load against the upstream side of the gate face being transmitted to said bearings in planes extending substantially normal to the gate face and in alinement with the piers.

2. A spillway gate system comprising a radial gate having a face extending transversely of the spillway, a pair of stationary piers in the bed of the spillway and extending longitudinally of the spillway at the downstream side of the gate face, said piers being spaced from the sides of the spillway and spaced apart a distance less than the face width, said gate comprising spaced arms attached to said face and extending down stream therefrom, and bearings carried by said piers in alinement with said arms and mounting the arms for vertical swinging of the gate, said arms being positioned relative to the gate face and bearing so that the resultants of the forces created by the water load against the upstream side of the gate face being transmitted to said bearings through the arms in planes alined with the piers and extending substantially normal to the gate face.

3. A spillway gate system comprising a radial gate having a face extending transversely of the spillway, a pair of stationary piers extending longitudinally of the spillway at the downstream side of the gate face, said piers being spaced from the sides of the spillway and spaced apart a distance less than the face width, said gate comprising arms attached to said face and extending to the piers, bearings carried by said piers and mounting said arms for vertical swinging of the gate, said arms extending down stream from the bearings and being positioned relative to the gate face and bearings so that the resultants of the forces created by the water load against the upstream side of the gate face being transmitted to said bearings in planes extending substantially normal to the gate face from locations spaced inwardly from its ends and in alinement with the piers, and means attached to said arms at the downstream side of said bearings and operable to raise and lower the gate.

4. A spillway gate system comprising a radial gate having a face extending transversely of the spillway, a pair of stationary piers extending longitudinally of the spillway at the downstream side of the gate face, openings in the piers, said piers being spaced from the sides of the spillway and spaced apart a distance less than the face width, said gate comprising arms attached to said face and extending to the piers, bearings carried by said piers and mounting said arms for vertical swinging of the gate, said arms extending down stream from the bearings and being positioned relative to the gate face and bearings so that the resultants of the forces created by the water load against the upstream side of the gate face being transmitted to said bearings in planes extending substantially normal to the gate face, and counterweights carried by said arms at the downstream side of said bearings and downwardly receivable within said openings in the piers when the gate is raised.

5. A spillway gate system comprising a radial gate having a face extending transversely of the spillway, a pair of stationary piers extending longitudinally of the spillway at the downstream side of the gate face, said piers being spaced from the sides of the spillway and spaced apart a distance less than the face width, said gate comprising arms attached to said face and extending to the piers, bearings carried by said piers and mounting said arms for vertical swinging of the gate, said arms extending down stream from the bearings and being positioned relative to the gate face and bearings so that the resultants of the forces created by the water load against the upstream side of the gate face being transmitted to said bearings in planes extending substantially normal to the gate face from locations spaced inwardly from its ends and in alinement with the piers, and means attached to said arm assemblies at the downstream side of said bearings and operable to raise and lower the gate.

6. A spillway gate system comprising a radial gate having a face extending transversely of the spillway, a pair of stationary piers positioned between and spaced from the side of the spillway downstream from the gate, openings in the piers, said piers being spaced apart a distance less than the face width, said gate including spaced pairs of arm assemblies each comprising a pair of parallel arm structures extending at substantially right angles to the gate face from locations spaced from the ends thereof, bearings carried by said piers between the arm structures of each pair and mounting said arm assemblies for vertical swinging movement of the gate, said arms extending downstream from the bearings, and counterweights carried by said arm assemblies at the downstream side of said bearings and movable downwardly within said openings in the piers when the gate is raised.

7. A spillway gate system comprising a series of radial gates having face portions in substantially end-to-end relation across the spillway, a series of spaced stationary piers positioned between and all spaced from the sides of the spillway downstream from the gate faces, said series comprising successive pier pairs each pair being alined with a respective one of the gates in the direction of the spillway, the piers in each pair being spaced apart a distance less than the gate width, each gate including arms attached to its face portion and extending to the pair of piers alined with the face portion, and bearings carried by the piers and mounting said arms for vertical swinging of the gates, said arms being positioned relative to the gate face and bearing so that the resultants of the forces created by the water load against the upstream sides of the gate faces being transmitted through said arms to the bearings in planes extending normal to the gate faces from locations spaced inwardly from their end and alined with the piers.

8. A spillway gate system comprising a series of radial gates having face portions in substantially end-to-end relation across the spillway, a series of spaced stationary piers positioned between and all spaced from the sides of the spillway downstream from the gate faces, said series comprising successive pier pairs each pair being alined with a respective one of the gates in the direction of the spillway, the piers in each pair being spaced apart a distance less than the gate width, each gate including arms attached to its face portion and extending to the pair of piers alined with the face portion, and bearings carried by the piers and mounting said arms for vertical swinging of the gates, said arms being positioned relative to the gate face and bearing so that the resultants of the force created by the water load against the upstream sides of the gate faces being transmitted through said arms to the bearings in planes extending normal to the gate faces from locations spaced inwardly from their ends and alined with the piers, adjacent ends of the gates being located midway between successive piers.

9. A spillway gate system comprising a series of radial gates having face portions in substantially end-to-end relation across the spillway, a series of spaced stationary piers positioned between and all spaced from the sides of the spillway downstream from the gate, said series comprising successive pier pairs each pair being alined with a respective one of the gates in the direction of the spillway, the piers in each pair being spaced apart a distance less than the gate width, each of said gates comprising a pair of spaced arm assemblies extending at substantially right angles from locations spaced from the ends of said face portion, each arm assembly comprising a pair of spaced arm structures, and bearings carried by said piers between said arm structures and mounting said arm assemblies for vertical swinging of the gates, the water load against the upstream side of the gate face being transmitted through said arms to the bearings in directions substantially normal to the horizontal extent of the gate face.

RAYMOND A. HILL.

REFERENCES CITED

The following references are of record in the file of this patent:

UNITED STATES PATENTS

| Number | Name | Date |
|---|---|---|
| 657,774 | Icke | Sept. 11, 1900 |
| 862,673 | Stickney | Aug. 6, 1907 |
| 1,506,230 | Fargo | Aug. 26, 1924 |
| 1,587,616 | Sudler | June 8, 1926 |
| 2,322,846 | Growdon | June 29, 1943 |

FOREIGN PATENTS

| Number | Country | Date |
|---|---|---|
| 195,183 | Germany | 1908 |
| 234,999 | Switzerland | Mar. 1, 1945 |